United States Patent [19]

Wilkinson et al.

[11] 4,333,515
[45] Jun. 8, 1982

[54] PROCESS AND SYSTEM FOR BOOSTING THE TEMPERATURE OF SENSIBLE WASTE HEAT SOURCES

[75] Inventors: William H. Wilkinson, Columbus; William T. Hanna, Gahanna, both of Ohio

[73] Assignee: Battelle Development Corp., Columbus, Ohio

[21] Appl. No.: 177,663

[22] Filed: Aug. 13, 1980

[51] Int. Cl.³ .............................................. F25B 15/00
[52] U.S. Cl. .................................... 165/1; 62/101; 62/238.1
[58] Field of Search ............... 165/1; 62/102, 101, 62/238.1

[56] References Cited

U.S. PATENT DOCUMENTS 4,089,186  5/1978  Rojey et al.
4,094,355  6/1978  Blytas
4,102,388  7/1978  Blytas
4,167,101  9/1979  Rojey

OTHER PUBLICATIONS

Cohen et al., "A New Absorption-Cycle Process for Upgrading Waste Heat", American Chemical Society, (1979).
Cohen et al., "Valorisation de Calories a Bas Niveau Au Moyen De Cycles Trithermes", Entropie, No. 84, (Nov.-Dec. 1978) & updated publication, Upgrading Thermal Wastes in Industry IFP Thermosorb Process.
Takaada, "Large Heat Pumps & Exhaust Heat Recovery", Refrigeration & Air Conditioning, vol. 26, No. 310, 12-19-75.
Wade et al., "Low Temperature Solar Industrial Cooling System", Proceedings-Institute of Environmental Sciences, (date unknown).
Williams et al., "A Heat Pump Powered by Natural Thermal Gradients", presented at 9th IECE Conference, Aug. 26-30, 1974.

*Primary Examiner*—Lloyd L. King
*Attorney, Agent, or Firm*—Biebel, French & Nauman

[57] ABSTRACT

Sensible waste heat from industrial or other sources is boosted to useful temperature levels by combining at least one Rankine vapor generation cycle with at least one solution heat pump cycle. Waste heat is first utilized to boil off refrigerant in the Rankine cycle evaporator to provide a source of relatively high pressure vapor to an absorber in the solution heat pump. In the absorber, the vapor is contacted with a working solution of absorbent and refrigerant. As the refrigerant vapor is absorbed into solution, its latent heats of condensation and solution are given off at a temperature higher than the temperature of to a process (boosted output) stream the waste heat source. The working solution is then throttled to a relatively low pressure desorber where a portion of the refrigerant is desorbed as vapor from the solution by the further use of waste heat. The desorbed refrigerant vapor is then condensed and pumped to the evaporator for reuse. Working solution is recycled from the desorber to the absorber for reuse. Utilization of the sensible waste heat, first source is maximized by extracting successive portions of heat for use in the Rankine cycle evaporator section and then in a heat pump cycle desorber section. Multiple cycle systems are disclosed which boost the temperature of a portion of the waste heat to even higher levels than possible from the single cycle system.

15 Claims, 11 Drawing Figures

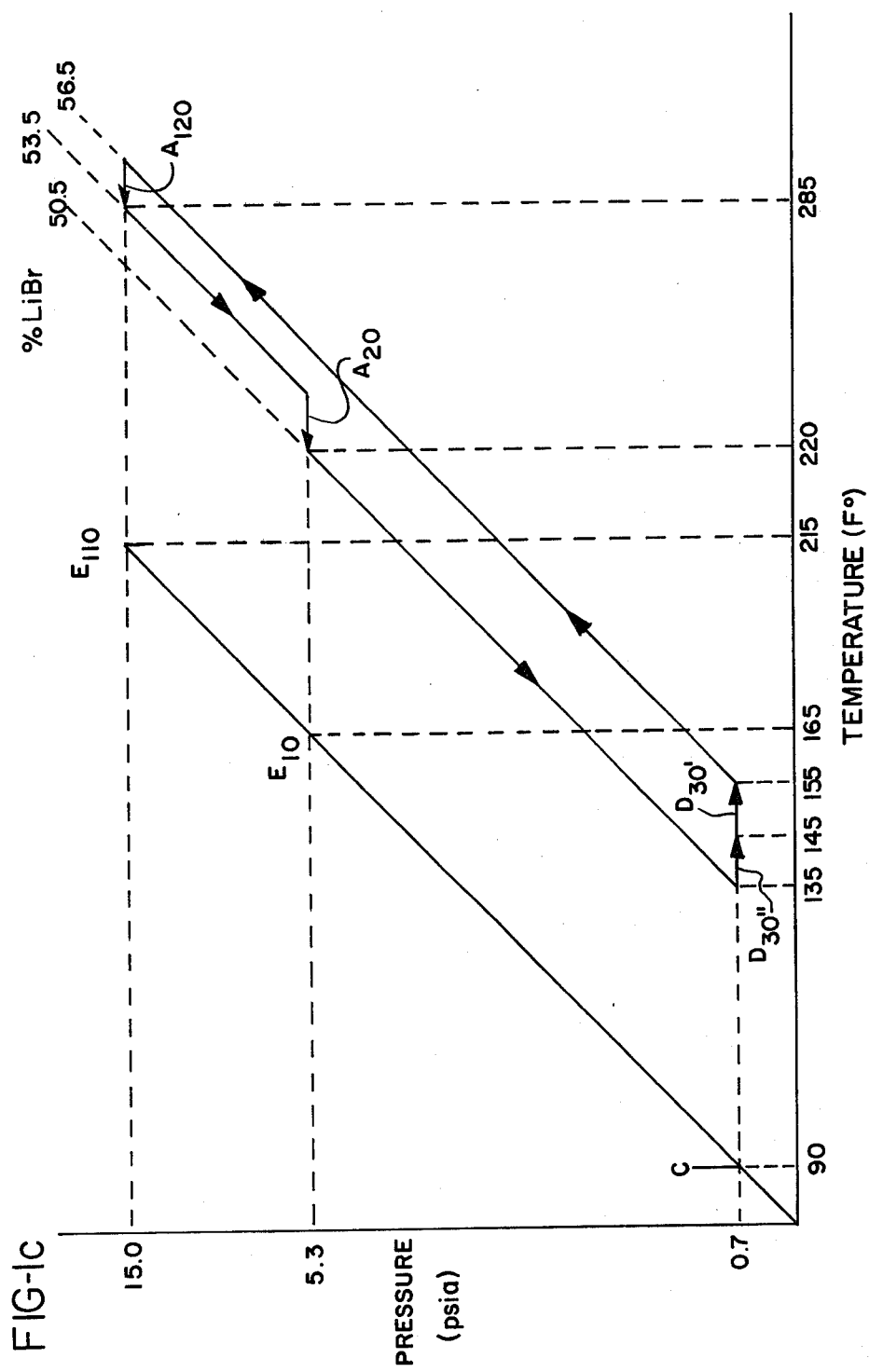

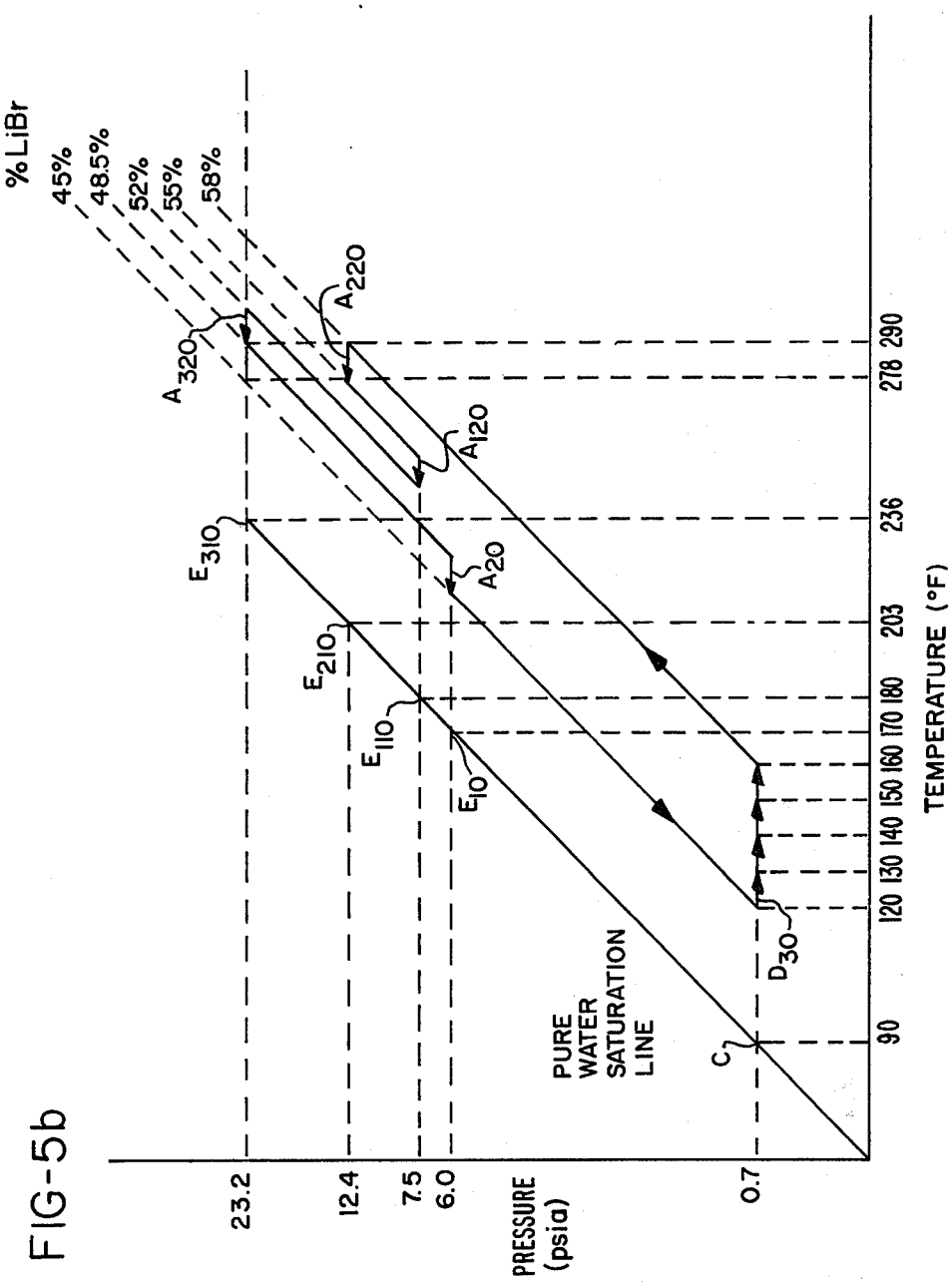

PROCESS AND SYSTEM FOR BOOSTING THE TEMPERATURE OF SENSIBLE WASTE HEAT SOURCES

BACKGROUND OF THE INVENTION

This invention relates to a system for producing heat at elevated temperatures by upgrading heat available from a lower temperature sensible heat source, and more particularly to the use of a combined Rankine cycle evaporator and absorption heat pump system having one or more stages which efficiently sensible waste heat from industrial or other sources to boost a portion of that heat to a useful level.

Many industries must dispose of large amounts of heat either produced as a by-product of a chemical reaction or through the operation of heat exchange process equipment because that heat is at too low a temperature for further use. The heat may be available as latent heat (i.e., low pressure steam) or sensible heat (i.e., hot water). Sources of this wasted heat include heat losses from boilers, drying equipment, chemical reactors, and the like and heat derived from heat exchange equipment. In many cases, substantial amounts of increasingly expensive fuel must be burned only to result in much of the heat produced being lost as waste heat. If a portion of this waste heat could be upgraded for further use, energy would be conserved and fuel cost savings realized.

A heat pump can be used to increase the temperature of waste heat (available as low pressure steam or heated fluid) to a useable level. For example, a vapor compression heat pump cycle can be operated using a compressor which provides high pressure fluid to a condenser. As the fluid condenses, it gives up heat (e.g., heat of condensation) at a temperature level higher than that of the fluid supplied to the compressor. After being throttled to an evaporator, the fluid vaporizes by accepting heat from an external source (e.g., ambient heat sink) and is recycled to the compressor.

However, work is required to operate the compressor, and in most cases this work is obtained from the combustion heat of fuel. Where the temperature boosts are modest, a savings in energy can be achieved when an efficient advanced power conversion system is employed. Where the power is supplied to the compressor from a central source such as electric power to drive an electric motor, the original source of energy can be a dirty fuel such as coal requiring costly pollution control, or an advanced fuel such as nuclear requiring careful safety monitoring. Attempting to reduce overall costs by burning clean fuels on site is offset by the system complexity and represents only a marginal savings at best.

It has been suggested to utilize some of the waste heat available in a heat engine to drive the compressor in a vapor compression heat pump cycle. For example, U.S. Pat. No. 4,089,186 teaches such a process in which at least a portion of a working fluid is vaporized utilizing the heat available from a waste heat source. A turbine runs a compressor which condenses the vapor. The heat of condensation of the vapor is then utilized to raise the temperature of a second fluid in a heat exchange zone. However, such a process still requires the use of a compressor and a turbine to run the compressor. Not only are these pieces of equipment expensive to buy and operate, but they also have a high loss of energy due to mechanical inefficiencies.

In order to eliminate the need for a compressor and turbine, an absorption cycle heat pump process may be utilized. In an absorption cycle, a secondary fluid, termed the absorbent, is employed to absorb a primary fluid, termed the refrigerant, which has been vaporized in an evaporator. In a conventional simple absorption heat pump cycle, heat from an external source is utilized in a desorber to produce a relatively high pressure refrigerant vapor which is then taken to a condenser. Heat which can be utilized is released upon condensation of the vapor. The liquid refrigerant is then vaporized using heat from a relatively low temperature external source and reabsorbed into the absorbent and an absorber where heat which can also be utilized is released. The refrigerant-absorbent solution is then pumped to the desorber to repeat the process. The use of a desorber and absorber eliminates the need for a compressor in the cycle but still requires high quality heat for operation.

A modification of a conventional absorption cycle heat pump is taught in U.S. Pat. No. 4,167,101 as a means to elevate the temperature of a waste heat source. In that substantially isobaric process, a vapor is absorbed into a liquid phase solvent in an absorption zone and releases its heat of solution to an external heat receiving medium. The solution is then taken to a stripping zone where a stripping gas desorbs the vapor from solution.

The resulting gaseous mixture is then fractionated by partial liquefaction and phase separation. The stripping gas is then recycled to the stripping zone while the liquid fraction is vaporized and then recycled to the absorber where the process is repeated. Although this process eliminates the need for a mechanical compressor, it has several disadvantages. The system is made more complex by the addition of a third component, a stripping gas, to it. Moreover, rather than having simple condensation and evaporation stages, the process requires partial liquefaction and phase separation to separate the stripping gas from a portion of the working fluid.

Williams and Tiedemann, in "A Heat Pump Powered by Natural Thermal Gradients," a paper presented at the 9th IECE Conference, Aug. 26-30, 1974, have suggested using a solution heat pump cycle and the temperature gradients that exist in subarctic climates between sea water and the ambient air to generate heat for residential housing. That proposal utilized an ammonia-water working fluid, a relatively high pressure absorber, and a relatively low pressure desorber as the solution heat pump. However, because of the low efficiency of the process and the requirement of a large and costly physical plant, the authors concluded that the system was impractical for its designed use.

Accordingly, the need exists in the art for an efficient heat boosting system which can upgrade waste heat from industrial and other sources.

SUMMARY OF THE INVENTION

In contrast to conventional absorption heat pumps as described above the present invention provides a system and process for increasing or boosting the temperature levels of sensible heat sources (i.e., thermal energy sources where the transfer of heat results in a change in temperature). Since the heat released by a sensible heat source is proportional to its temperature drop, the greater the range of temperatures over which heat can be extracted, the greater the amount of heat available for boosting. Generally, sensible waste heat sources will be available at between about 140° F. to 400° F. In boosting the temperature of such sources, a portion of the heat from the sensible heat source, typically a stream of hot water, is used to generate the power potential to drive a solution heat pump cycle. That cycle in turn is used to boost the temperature level of another portion of the waste heat to a more useful higher level.

The power cycle for the system is one or more Rankine cycles utilizing a condenser and boiler (evaporator). The working solution for the system can be any refrigerant-absorbent pair although a lithium bromide-water mixture is preferred. In operation, heat from a sensible waste heat source is used to boil off refrigerant from the evaporator which is then available as a source of high pressure vapor for the solution heat pump cycle.

In the solution heat pump, which can include one or more absorber sections in combination with one or more desorber sections, high pressure refrigerant vapor enters the absorber section where it is contacted with a liquid working solution of refrigerant and absorbent. As refrigerant vapor is absorbed into the liquid solution, it gives off latent heats of condensation and solution to a heat exchange fluid at a temperature higher than the temperature of the waste heat source.

The working solution which is now rich in refrigerant is then throttled and sent to a desorbing section. In the desorbing section, additional heat from the waste heat source is supplied to boil out (desorb) refrigerant vapor from the solution. This vapor is then passed to a condenser where it gives up its latent heat of condensation to an available heat sink at a temperature lower than that of the waste heat source. The condensate is then pumped back to the evaporator to complete the refrigerant loop.

At the desorber section, the working solution of refrigerant and absorbent that becomes lean in refrigerant (as the refrigerant vaporizes) is pumped back to the absorber section of the system where it is available for reuse.

In a preferred embodiment of the invention, the Rankine cycle evaporator first extracts heat from the sensible waste heat stream which is then fed to the desorber section of the system where more heat is extracted. In this manner, a greater amount of the heat available from the waste stream can be utilized by the system for boosting. In further embodiments of the invention, multiple evaporation and desorber sections are interconnected to further enhance waste heat utilization by the system.

For example, in one such system a pair of Rankine cycles are matched with a pair of absorption heat pump cycles. Waste heat is then utilized at four progressively lower temperature levels at the evaporator and desorber sections of the system. A common condenser is employed in vapor phase communication with both desorbers.

In yet another embodiment of the invention, two or more stages of temperature boosting are provided by supplying waste heat to a first evaporator section of the system. Refrigerant vapor from the first evaporator section is supplied to a first absorber section where the vapor gives up heat at an elevated temperature level as heats of condensation and solution. This elevated temperature level heat is then used to evaporate more refrigerant at a higher pressure in a second evaporator section. Refrigerant vapor is then supplied to a second absorber section which yields heat at an even higher temperature level. A multi-section desorber and a common condenser in fluid communication with the desorber complete the system. The use of additional evaporator and absorber sections are also within the scope of the invention.

The thermodynamic process which enables this temperature boosting system to function is the absorption of high pressure vapor from the evaporator into the refrigerant-lean solution in the absorber. This process takes place at temperatures above the saturation temperature of the refrigerant vapor, thereby releasing latent heats of condensation and solution of the refrigerant. It is this characteristic of releasing heat at increasingly elevated temperatures to a refrigerant-lean solution that provides the temperature boost, and the leaner the solution, the larger the boost will be.

Special treatment is necessitated for a thermal boosting process involving a sensible waste heat source because of the need to lower the temperature of the source to remove heat from it. In such a thermal boosting process, there is a thermodynamic relationship between the mean temperature of the waste heat source and the temperature boost potential. As more heat is extracted from the waste heat source, the mean temperature is reduced as is the boost potential. Consequently, sensible heat source thermal boosting systems quite often need internal staging of the boosting effect to attain a desired temperature level.

An approximation of the staging of boosting effects can be represented by an integer R defining the boost range (i.e., 1, 2, 3, or more). The performance of a thermal boost system can be generalized as follows:

$$T_B - T_W = 0.8R(T_W - T_S)$$

where, $T_B$ is the nomina boosted output temperature, $T_W$ is the average recovered waste heat temperature, and $T_S$ is the nominal sink temperature; and $$C.O.P. = 0.5(0.7)^{R-1}$$

where, C.O.P. is the coefficient of performance of the system and is defined as the ratio of the boosted heat output to the waste heat input.

The thermodynamic process which enables this temperature boosting system to maximize the extraction of heat from a sensible waste heat source is the segmented desorption of low pressure refrigerant vapor from a working solution of absorbent and refrigerant. This process takes place over a range of temperatures which are subdivided to match the sequences of heating supplied from the waste heat source. Moreover, since the absorption process is designed to occur in separate stages involving increasingly richer absorbent-refrigerant working solutions, the range of concentration differences encountered during the desorption process becomes larger. This larger range of concentration differences also means a larger range of temperture differences and permits increased segmentation of the desorption process in its heat transfer relationship with the waste heat source.

The thermodynamic cycle limits which define the approximate segmentation of the waste head D are related to the boost range R and a subdivision integer S such that:

$$D = (R+1)S$$

where, 1/D is the fractional part of the total usable waste heat temperature drop assigned to any given heat transfer segment, R is an integer defining the approximate boost range, and S in an integer. Examples of thermal boosting systems within the scope of the present invention include the following:

(a) R=1, S=1, and D=2. In this example approximately one-half of the available temperature drop of the waste heat source will occur across the evaporator and one-half across the desorber.

(b) R=1, S=2, and D=4. In this example, one-fourth of the available temperature drop will occur across each evaporator and desorber.

(c) R=2, S=1, and D=3.
(d) R=2, S=2, and D=6.
(e) R=3, S=1, and D=4.
(f) R=3, S=2, and D=8.

It is also within the scope of the present invention to provide for the simultaneous boosting of heat to two different levels. When boosted heat is to be used at more than one output temperature simultaneously, the waste heat segmentation can be represented as follows:

$$D_{R_1,R_2} = S(R_1 + (R_2 - R_1)f_{R_2})$$

where, $R_1 < R_2$, S is an integer (generally equal to 1 because such multi-stage systems involve a large enough segmentation number D that further subdivisions where $S > 1$ are not cost effective), and $f_{R_2}$ is the fraction of total process heat used at boost range $R_2$.

The above generalization can be extended to the situation where there are three simultaneous boosted heat outputs by the following equation:

$$D_{R_1,R_2,R_3} = R_1 + (R_3 - R_1)f_{R_3} + (R_2 - R_1)f_{R_2}$$

where, $R_1 < R_2 < R_3$, $f_{R_3}$ is the fraction of total process heat used at boost range $R_3$, and $f_{R_2}$ is the fraction of total process heat used at boost range $R_2$.

Accordingly, it is an object of the present invention to provide an efficient thermal boosting process and system which utilizes heat from a sensible waste heat source to produce useful heat at elevated temperatures. This and other objects and advantages of the system will become apparent from the following description, the accompanying drawings, and the appended claims.

BRIEF DESCRIPTION OF THE DRAWINGS

FIG. 1b is a schematic illustration and FIG. 1c is a P-T-x diagram of a modification of the system illustrated in FIG. 1a to show increased thermal boosting effects;

FIGS. 5a and 5b are P-T-x diagrams illustrating the pressure, temperature, and concentration relationships of the components illustrated in FIGS. 4a and 4b, respectively.

DESCRIPTION OF THE PREFERRED EMBODIMENTS

Figure 1A:
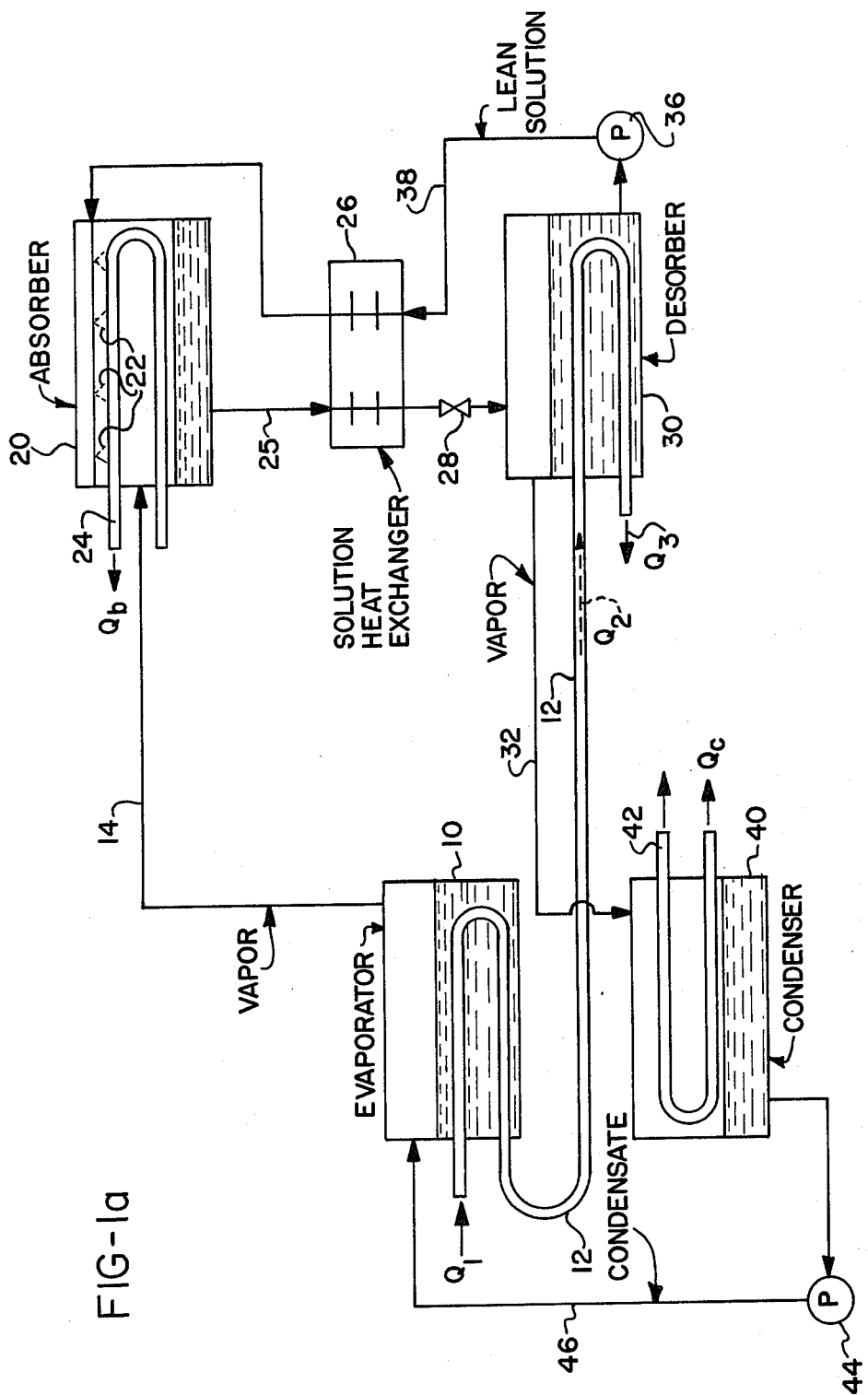
FIG. 1a is a schematic illustration of the basic components of the thermal boosting system of the present invention.

Referring to FIG. 1a, the basic components of the sensible heat boosting system include an evaporator 10, an absorber 20 where refrigerant vapor is contacted with a liquid solution of absorbent and refrigerant, a desorber 30 where at least a portion of the refrigerant in solution is vaporized, and a condenser 40. As shown, evaporator 10 is supplied with heat from a sensible waste heat source with the waste heat stream dropping proportionately in temperature. The waste heat stream then gives up a further increment of heat to desorber 30 before being discharged at an even lower temperature level. In this manner, a greater part of the available waste heat is utilized by the system. Condenser 40 rejects heat to an available heat sink at a temperature lower than the initial temperature of the waste heat source. The absorber 20 yields heat at the boosted temperature level higher than the initial temperature of the waste heat source.

In operation, a source of waste heat $Q_1$ at a temperature $t_1$ ($t_1 > t_2 > t_3$) is supplied through a heat exchange fluid in conduit 12 to evaporator 10 where a portion of the heat is given up to evaporate refrigerant as the temperature of the heat exchange fluid drops to $t_2$. The evaporator 10 is generally maintained under a relatively high pressure with respect to condenser 40. This relatively high pressure is typically about 5-25 psia for a lithium bromide (absorbent)-water(refrigerant) system. The application of heat to the liquid refrigerant in evaporator 10 causes at least a portion of it to vaporize.

The refrigerant vapor is then driven, by a slight difference in vapor pressure, through line 14 to absorber 20. Absorber 20, which is also maintained at substantially the same relatively high pressure as evaporator 10, holds a liquid solution of an absorbent and a refrigerant. As refrigerant vapor enters absorber 20, an absorbent-refrigerant solution which is lean in refrigerant (i.e., has a lower percentage refrigerant content) is sprayed from nozzles 22 and contacts the vapor. As vapor is absorbed into solution, it releases latent heats of condensation and solution, boosting the temperature in the absorber to a level higher than the temperature of the sensible waste heat source. This boosted heat $Q_b$ released by the absorption of the vapor into solution is then transferred via a heat exchange fluid in conduit 24 to an external process stream for ultimate use.

The absorbent-refrigerant solution, now rich in refrigerant (i.e., having a higher percentage refrigerant content), is then passed through line 25, solution heat exchanger 26, and expansion valve 28 to desorber 30. As the solution passes through expansion valve 28, it expands as its temperature and pressure is adiabatically reduced to the pressure level maintained in the desorber. Desorber 30 and condenser 40 are generally maintained at the same relatively low pressure. For a lithium bromide water system this pressure is about 0.5-3 psia.

In desorber 30, heat $Q_2$ at a temperature $t_2$ ($t_2 > t_3$) is supplied via a heat exchange fluid in conduit 12 to the absorbent-refrigerant solution. The heat causes at least a portion of the refrigerant in solution to desorb and vapor is supplied to conduit 32. The heat exchange fluid in conduit 12 leaves desorber 30 having a remaining heat $Q_3$ and at a temperature $t_3$. Under a slight difference in vapor pressure, the refrigerant vapor is driven through conduit 32 to condenser 40. In condenser 40, the vapor is condensed into its pure liquid state, giving up its latent heat of condensation $Q_c$ through a heat exchange fluid in conduit 42 to an available heat sink at a temperature $t_s$. Suitable heat sinks include large bodies of water such as a river or lake or can be the ambient air surrounding the system. The condensate is then transported by pump 44 through line 46 back to evaporator 10 to complete the refrigerant loop. Pump 44 must be selected to provide refrigerant at the relatively high pressure maintained in the evaporator.

The remaining absorbent-refrigerant solution in desorber 30 which is now lean in refrigerant is transported by pump 36 through line 38 and recuperative heat exchanger 26 to absorber 20. In heat exchanger 26 some of the heat from the hot rich solution in line 25 is given up to the lean solution in line 38. The heat exchange minimizes flash vaporization which occurs when the rich solution is throttled through expansion valve 28 to the desorber pressure. The heat transferred to the lean solution in line 38 also minimizes the additional heat necessary to raise its temperature to the temperature level maintained in the absorber.

Figure 1B:
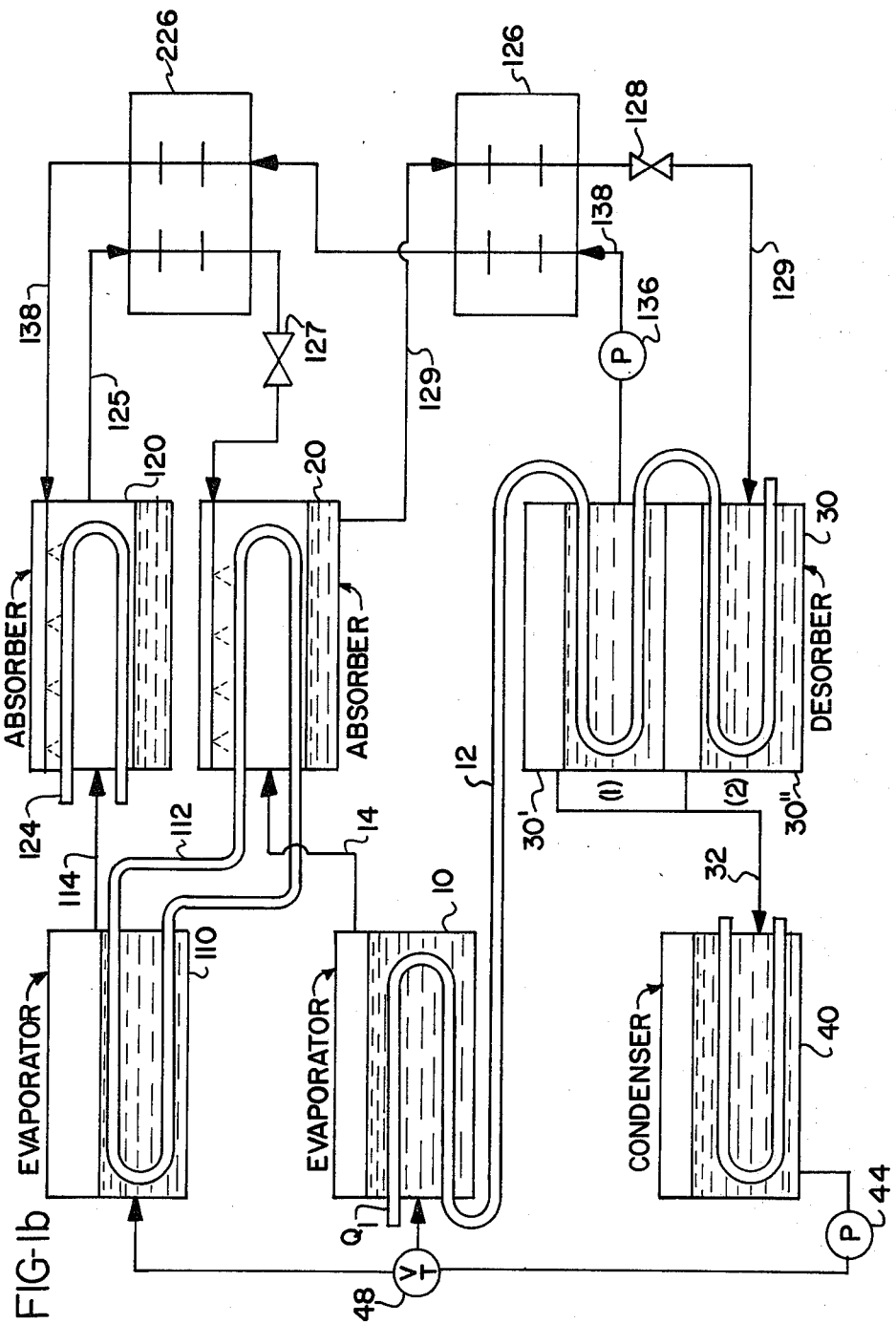

The basic system illustrated in FIG. 1a is an example of a system having a boost range of R=1, a subdivision value of S=1, and a segmentation value of D=2. The system illustrated in FIGS. 1b and 1c is an example of a system having a boost range of R=2, a subdivision valve of S=1, and a segmentation value of D=3. As shown in FIG. 1b, a source of waste heat $Q_1$ is supplied through a heat exchange fluid in conduit 12 to evaporator 10 where a portion of the heat is given up to evaporate refrigerant. The remaining waste heat is then successively passed through segmented desorber 30 (sections 30' and 30") where it gives up further amounts of heat to desorb refrigerant from solution as vapor.

Condensate is supplied to evaporators 10 and 110 via pump 44 in line 46. A throttle valve 48 may be used to control the amount of condensate supplied to each evaporator. The evaporators are maintained at different pressures since they operate at different temperatures. High pressure evaporator 110 is driven by heat supplied from absorber 20 via heat exchange loop 112 while evaporator 10 is driven by heat from the waste heat source.

Refrigerant is evaporated in evaporator 10 and passes via line 14 into absorber 20. There the vapor is contacted by a working solution of absorbent and refrigerant. As vapor is absorbed into solution, it releases latent heats of condensation and solution at an elevated temperature which is then used to drive evaporator 110. The vapor produced in evaporator 110 passes into absorber 120 via line 114 where it is also contacted with a working solution of absorbent and refrigerant. The boosted heat resulting from the absorption process is then transferred via a heat exchange fluid in conduit 124 to an external process stream for further use.

The absorbent-refrigerant solution leaving absorber 120 passes through line 125 and recuperative heat exchanger 226, and expansion valve 127 to absorber 20 where it is further enriched. The solution leaving absorber 20 passes through line 129, recuperative heat exchanger 126, and expansion valve 128 to segmented desorber 30. In desorber sections 30' and 30" the solution is heated in sequence by heat from the waste heat source in conduit 12 to desorb refrigerant as vapor. The refrigerant vapor is collected and sent to condenser 40 via line 32 to complete the refrigerant loop. Refrigerant lean solution leaving desorber 30 is transferred via pump 136 through line 138 and recuperative heat exchangers 126 and 226 to absorber 120 to complete the working solution loop.

As illustrated by the pressure-temperature-concentration diagram in FIG. 1c, heat from a waste heat source entering at 180° F. is utilized by extracting it in three approximately equal temperature drops of 10° F. each to operate evaporator 10, designated $E_{10}$ at 165° F.(5.3 psia), and desorber segments 30'($D_{30'}$) and 30"($D_{30}$) at pool temperatures of 155° F. and 145° F., respectively. This assumes that the desorber segments operate as well-mixed pools and all heat exchangers are designed for a log mean temperature difference of approximately 10° F. With the condenser (C) operating at 90° F., the weak solution leaving desorber 30 is 56.5% LiBr. The strong solution leaving absorber 20 is 50.5% LiBr while the strong solution leaving absorber 120 is 53.5% LiBr. Absorber 20($A_{20}$) operates at about 220° F. while absorber 120, supplied with vapor by evaporator 110($E_{110}$) at about 215° F. and 15.0 psia, releases heat at a boosted level of about 285° F. Of course, it will be apparent to those skilled in the art that higher boost ranges (R>2) can be achieved by utilizing the heat released by absorber 120 to drive another evaporator-absorber pair at even higher temperature and pressure levels.

Figure 2A:
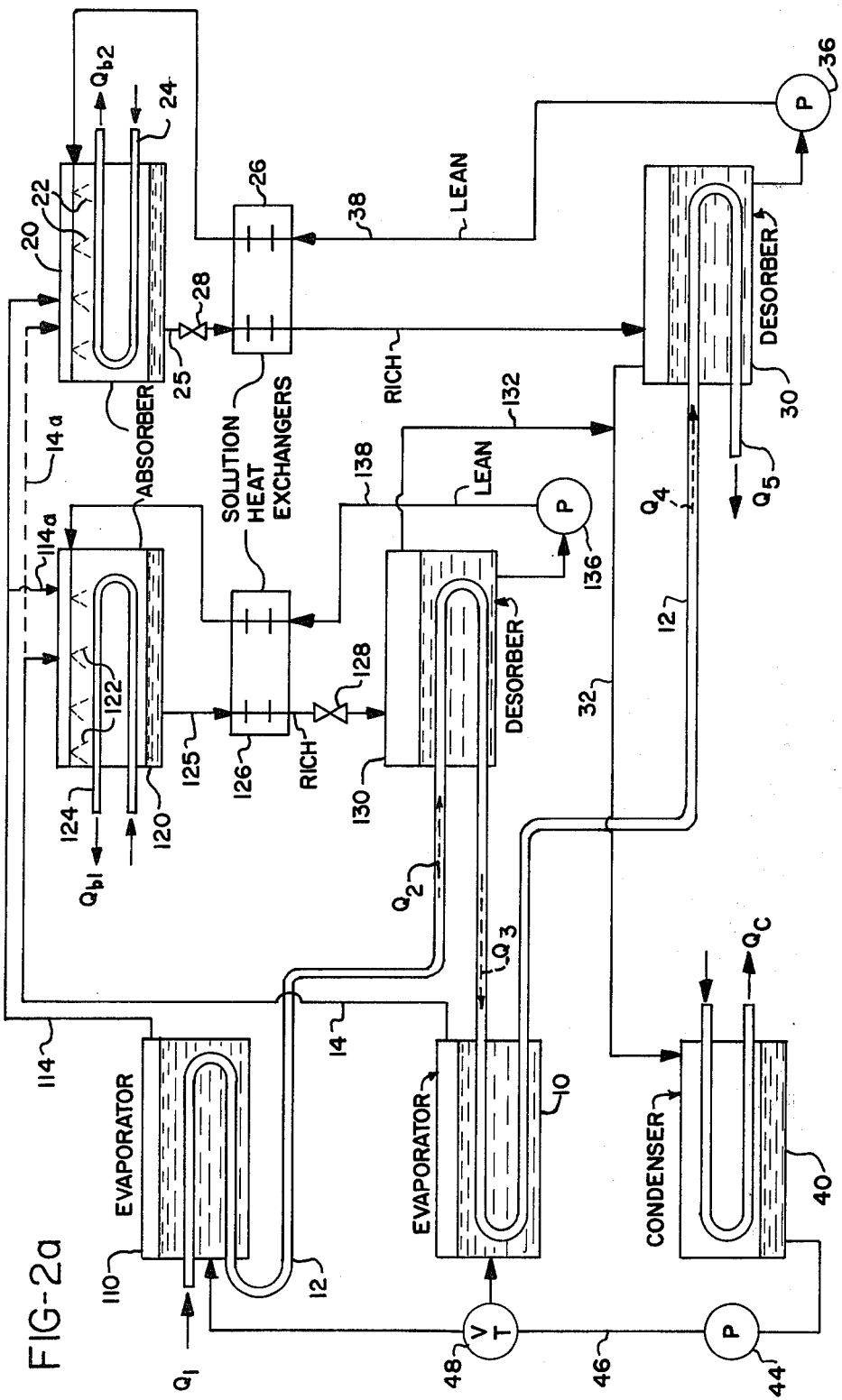
FIGS. 2a and 2b are also schematic illustrations of alternative embodiments of a multieffect thermal booster.
Figure 2B:
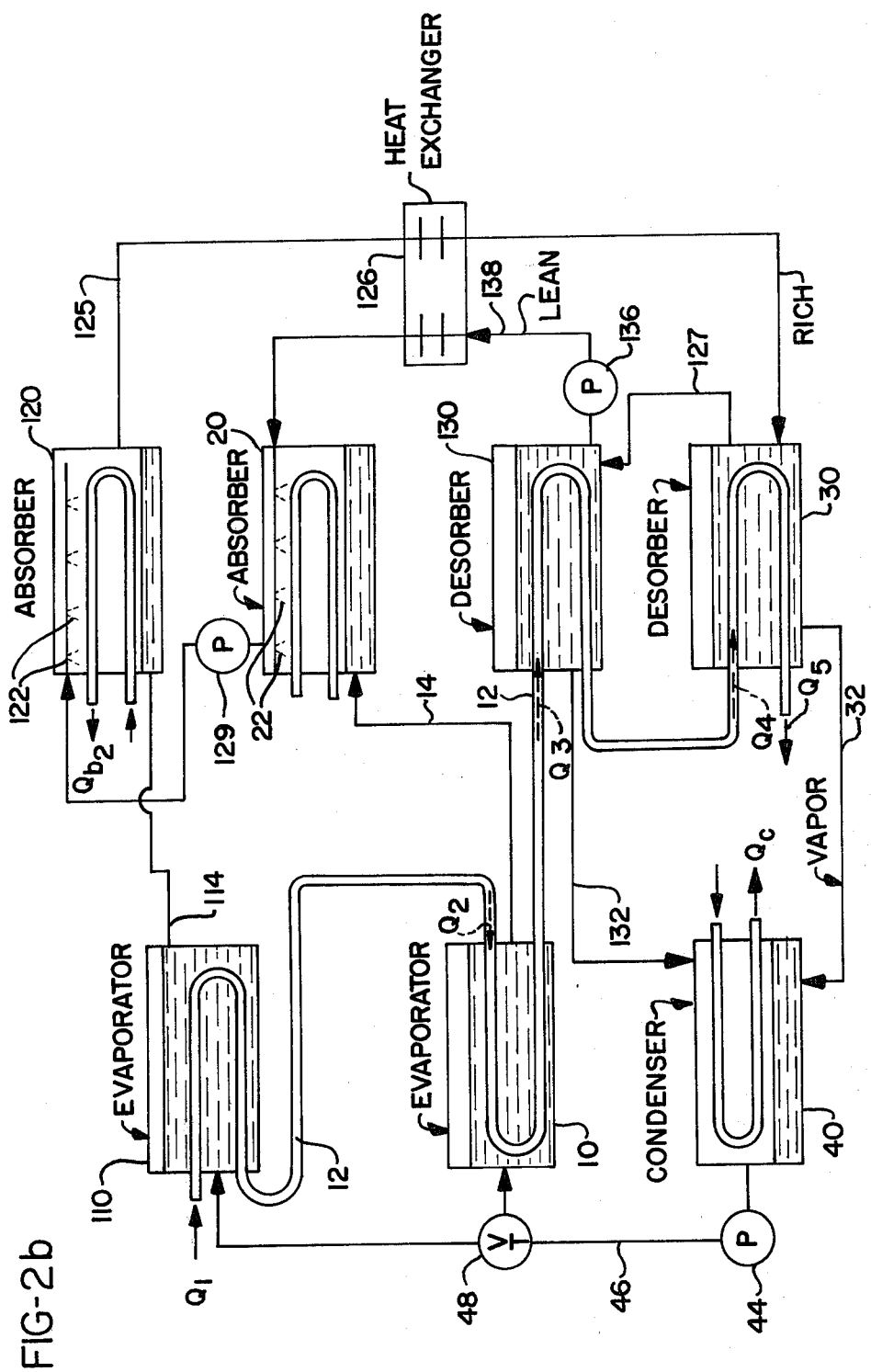

To further increase the amount of sensible heat which can be extracted from a waste heat source, the basic system can be modified as shown in FIGS. 2a and 2b to form paired systems to give systems in which R=1, S=2, and D=4. For the purposes of this invention, a paired system will be defined as a system in which a pair of Rankine cycle evaporators are matched with a pair of absorption heat pump cycles. Waste heat from a sensible waste heat source is utilized at four progressively lower temperature levels as heat is extracted at the two evaporators and two desorbers in the paired system. A common condenser is employed which is in vapor phase communication with both desorbers. The desorber working with the stronger solution (i.e., a greater percentage of refrigerant) receives heat at the lowest temperature level.

In the embodiment illustrated in FIG. 2a, with like components represented by like reference numerals, a source of waste heat $Q_1$ at a temperature $t_1$ is supplied through a heat exchange fluid in conduit 12 to evaporator 110 where a portion of the heat is given up to evaporate refrigerant. The remaining waste heat $Q_2$ at temperature $t_2$ is then passed successively through desorber 130, evaporator 10, and desorber 30 where the heat content of the waste heat stream is reduced to progressively lower heat contents to $Q_3$, $Q_4$, and to $Q_5$, the heat content of the leaving stream.

Condensate is supplied to evaporators 10 and 110 via pump 44 in line 46. A throttle valve 48 may be used to control the amount of condensate supplied to each evaporator. The evaporators are maintained at different pressures since they operate at different temperatures. High pressure evaporator 110 receives heat at the highest temperature from the waste heat source and is in vapor communication via line 114 with high pressure absorber 20.

As refrigerant vapor enters absorber 20, the lean absorbent-refrigerant solution is sprayed from nozzles 22 and contacts the vapor. As vapor is absorbed into solution, it releases its latent heats of condensation and solution $Q_{b2}$ at an elevated temperature which is transferred via a heat exchange fluid in conduit 24 to an external process stream for further use. The now rich absorbent-refrigerant solution passes through line 25, solution heat exchanger 26, and expansion valve 28 to desorber 30.

In desorber 30, heat $Q_4$ is supplied via a heat exchange fluid in conduit 12 which vaporizes at least a portion of the refrigerant in solution. The refrigerant vapor is then driven under a slight difference in vapor pressure through line 32 to common condenser 40. The lean solution from desorber 30 is pumped by pump 36 through line 38 and solution heat exchanger 26 back to absorber 20.

Figure 3A:
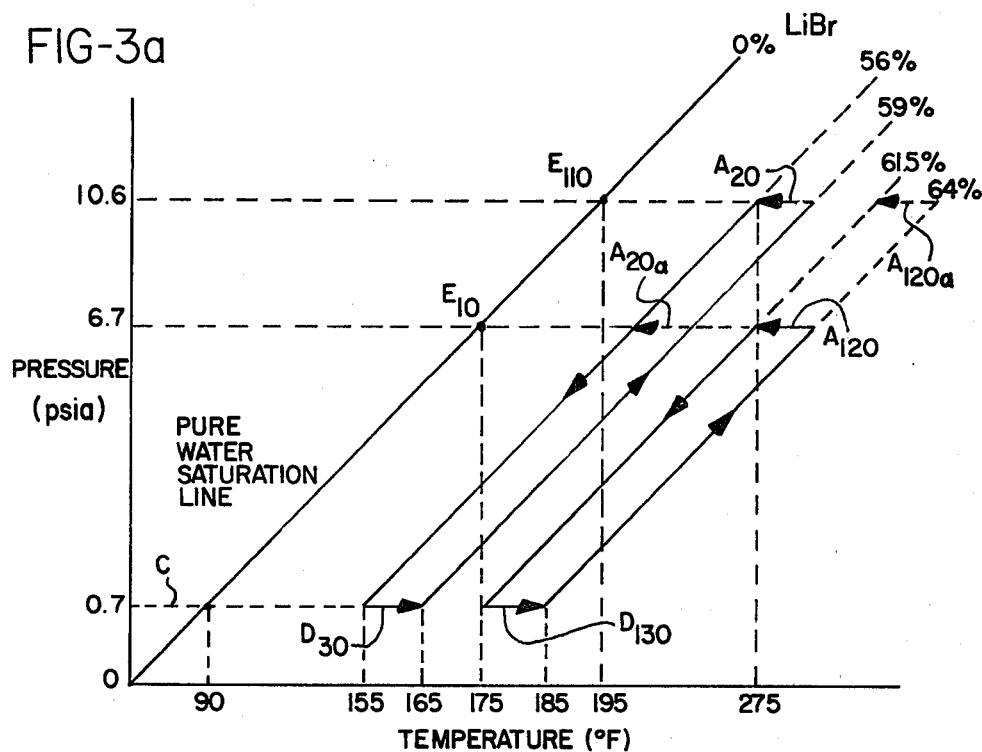
FIGS. 3a and 3b are P-T-x diagrams illustrating the pressure, temperature, and concentration relationships of the components illustrated in FIGS. 2a and 2b.

At the same time, further portions of waste heat are being utilized by evaporator 10 and desorber 130 to provide boosted heat $Q_{b1}$ in absorber 120. This boosted heat $Q_{b1}$ will be at essentially the same temperature as the heat $Q_2$ produced in absorber 20. These boosted heat streams can be reversed or used separately as required. Alternatively, the evaporator and absorber hook-ups can be received so that vapor leaving evaporator 110 is sent to absorber 20 through conduit 114a and vapor leaving evaporator 10 is sent through conduit 14a to absorber 20. As shown by the P-t-x diagram in FIG. 3a, this alternative embodiment of the invention provides boosted heat at different temperatures from each absorber.(shown as $A_{20a}$ and $A_{120a}$).

Heat from a waste stream entering at 210° F., for example, can be utilized by extracting it in four approximately equal temperature drops of 10° F. each to operate evaporator 110, designated $E_{110}$ at 195° F.(10.6 psia), desorber 130($D_{130}$) at a pool temperature of 185° F.(0.7 psia), evaporator 10($E_{10}$) at 175° F.(6.7 psia), and desorber 30 ($D_{30}$) at a mixed pool temperature of 165° F.(0.7 psia). With the condenser (C) operating at 90° F., the weak solution leaving desorber 30 is 59% LiBr and the weak solution leaving desorber 130 is 64% LiBr. The strong solution leaving absorber 20 is 56% LiBr while the strong solution leaving absorber 120 is 61.5% LiBr. Both absorbers release heat at a boost temperature of 275° F. The waste steam would leave the system at a temperature of 170° F.

A preferred embodiment of the paired system illustrated in FIG. 2a is shown by FIG. 2b. In this embodiment, where like components are again represented by like reference numerals, a source of waste heat $Q_1$ is supplied through a heat exchange fluid in conduit 12 to evaporator 110 where a portion of the heat is given up to evaporate refrigerant. The remaining waste heat is then successively passed through evaporator 10, desorber 130, and desorber 30 where it gives up further amounts of heat reducing the heat content to $Q_2$, $Q_3$, and $Q_4$, and finally to $Q_5$, the exit heat content of the waste stream, respectively.

In this embodiment, the lower pressure evaporator 10 operates at a temperature higher than that of the weak (i.e., a lesser percentage of refrigerant) desorber 130, and the discharge from the strong desorber 30 flows directly into the weak desorber 130 through line 127. Only one solution heat exchanger 126 is required in this embodiment, and it is positioned between weak desorber 130 and lower temperature absorber 20. Pump 136 returns lean solution from desorber 130 to absorber 20 while pump 129 supplies partially enriched solution to higher temperature absorber 20. Alternatively, pump 129 can be eliminated by maintaining a gravity head between absorbers 20 and 120.

Such paired systems are capable of increasing the portion of waste heat boosted to a given higher temperature from a sensible heat source. For example, utilizing the paired system illustrated in FIG. 2b with a lithium bromide absorbent water refrigerant composition, energy from a waste heat stream at 210° F. can be used to provide heat at a boost temperature of 275° F.

Figure 3B:
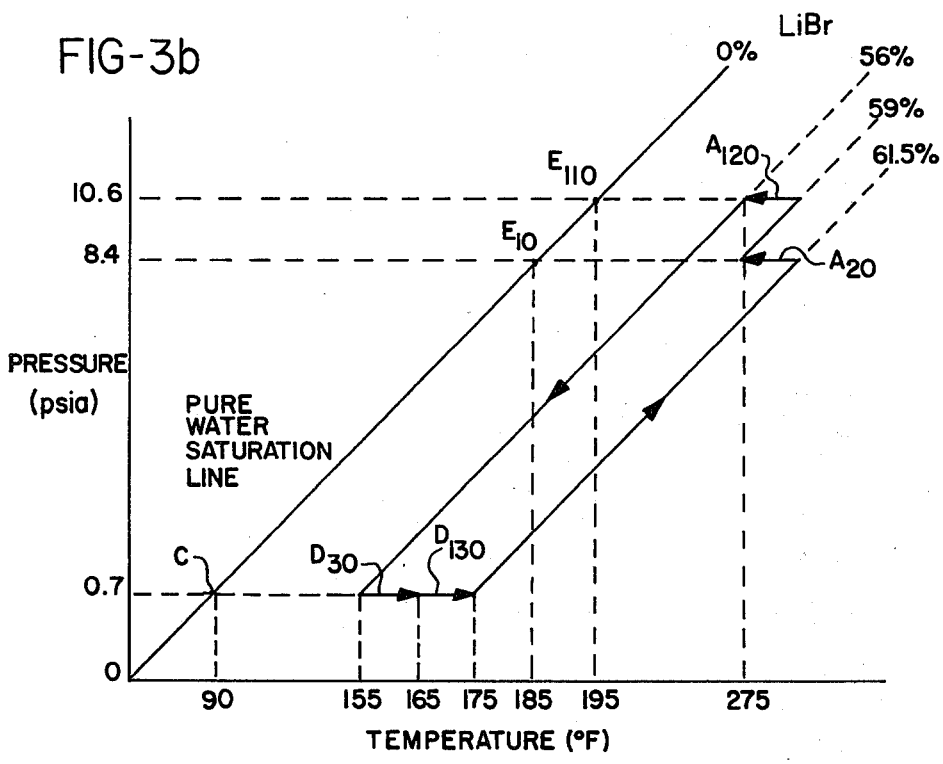

As shown by the pressure-temperature-concentration diagram in FIG. 3b, heat from a waste stream can be utilized by extracting it in four approximately equal temperature drops of 10° F. each to operate evaporator 110, designated $E_{110}$, at 195° F. (10.6 psia), evaporator 10 ($E_{10}$) at 185° F. (8.4 psia), desorber 130($D_{130}$) at a mixed pool temperature of 175° F. (0.7 psia), and desorber 30 ($D_{30}$) at a pool temperature of 165° F.(0.7 psia). With the condenser (C) operating at 90° F., the weak solution leaving desorber 30 is 59% LiBr and the weak solution leaving desorber 130 is 61.5% LiBr. The strong solution leaving absorber 120 is 59% LiBr while the strong solution leaving absorber 20 is 56% LiBr. Both absorbers release heat at a boost temperature of 275° F. which can be used, for example, to produce 40 psia process steam. The waste heat stream would leave the paired system at a temperature of 170° F. In contrast, the waste heat leaving a non-paired system and providing the same boost temperature would be about 182° F. with the same waste heat conditions applied to the evaporator and desorber or would be about 175° F. if a non-paired embodiment of this application is employed.

Using the condensing temperature (90° F.) as a thermodynamic reference, the paired system in the above example utilizes about one-third of the entering waste heat energy and boosts half of it to a useful level so the net recovery is about 17%. For the same conditions the net recovery of the non-paired system described in FIG. 1a is 15%. Applying the teaching of previous disclosures where the same waste heat conditions are applied to both the evaporator and desorber, the net recovery would be only 12%.

By using multiple combinations of Rankine cycle evaporators with absorption heat pump cycles, even greater amounts of waste heat can be utilized. For example, a triple combination system utilizing three evaporators, three absorbers, and three desorbers with a common condenser could utilize six 10° F. increments of waste heat. For a 210° F. waste heat source, boosted heat at about 252° F. could be recovered representing about 25% net recovery of the waste heat. Other multiple combinations can be utilized to recover an even greater percentage of waste heat as boosted heat.

It is also within the scope of this invention to provide systems which can utilize heat from a sensible waste heat source to provide boosted heat at temperatures two to three times as great as the temperature difference between the mean recovery temperature of the waste heat source and the ambient sink temperature i.e., systems having R values of $R \geq 2$. In such systems, two or more stages of Rankine cycle evaporators using a common condenser and two or more evaporators are used in combination with two or more stages of absorption heat pumps. The lower pressure evaporator or evaporators are driven by heat from a sensible waste heat source and are in vapor communication with respective lower pressure absorbers. The boosted heat available from the lower pressure absorbers at an intermediate temperature is in turn utilized to drive higher pressure evaporators. The higher pressure evaporators are in vapor communication with absorbers operated at the same higher pressures. It is these absorbers which provide the boosted heat for external process use. The absorption heat pump portion of the system uses parallel solution flow loops having one or more desorbers feeding absorbent-refrigerant solution to each respective absorber.

Figure 4A:
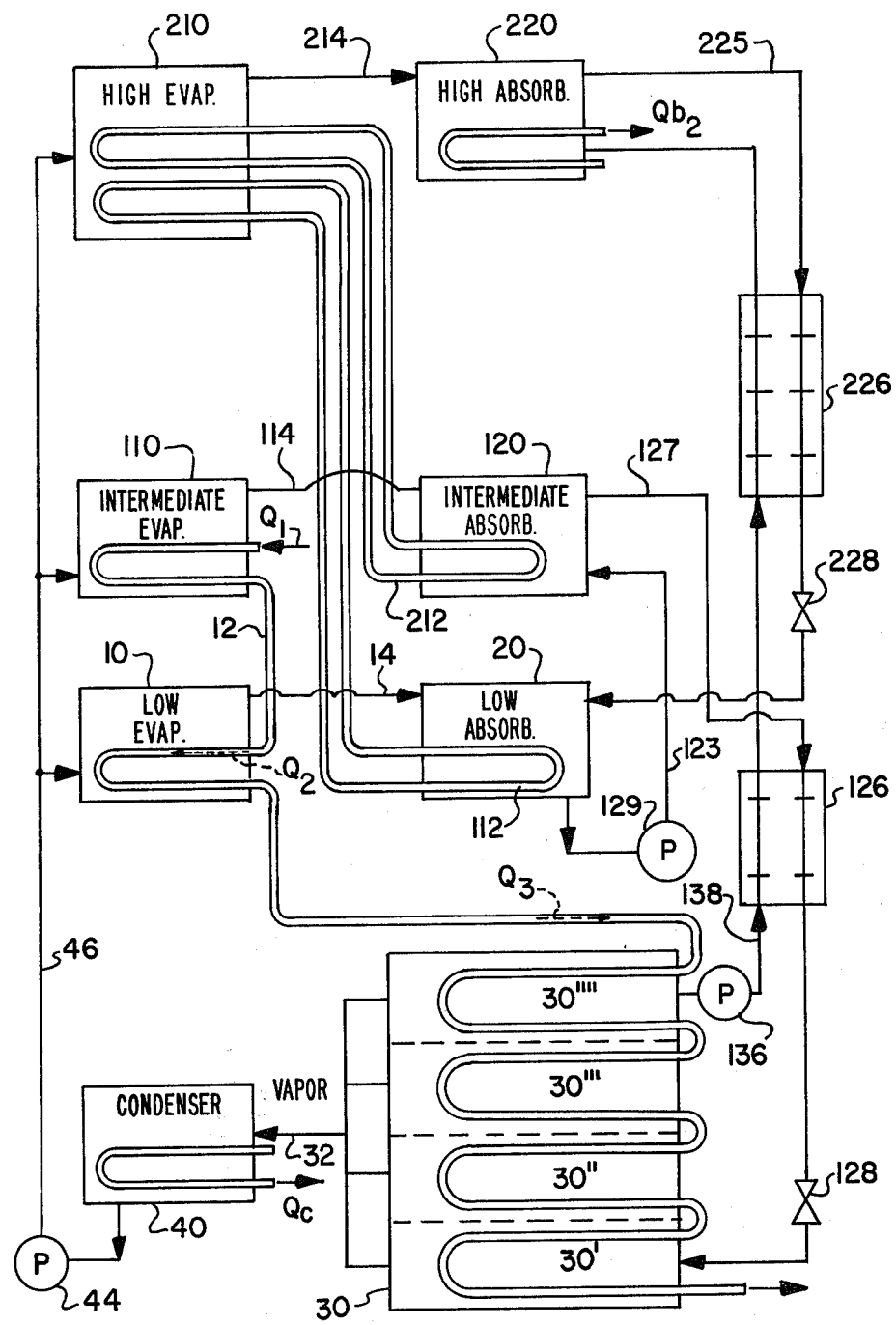
FIGS. 4a and 4b are a schematic illustrations of yet another embodiment of the invention showing a multi-stage, multi-effect thermal boosters.

An example of such a system is illustrated in FIG. 4a where like reference numerals represent like components. Three evaporators 10, 110, and 210 operating at three different pressure and temperature levels are in vapor communication through lines 14, 114, and 214 with absorbers 20, 120 and 220, respectively. Evaporators 10 and 110 obtain heat from a waste heat stream via the heat exchange fluid in conduit 12 while evaporator 210 obtains heat from absorbers 20 and 120 through heat exchange fluid in conduits 112 and 212. Absorber 220 provides boosted heat $Q_{b2}$ at approximately twice the temperature of the difference between the mean recovery temperature of the waste heat source and the ambient sink temperature.

Figure 5A:
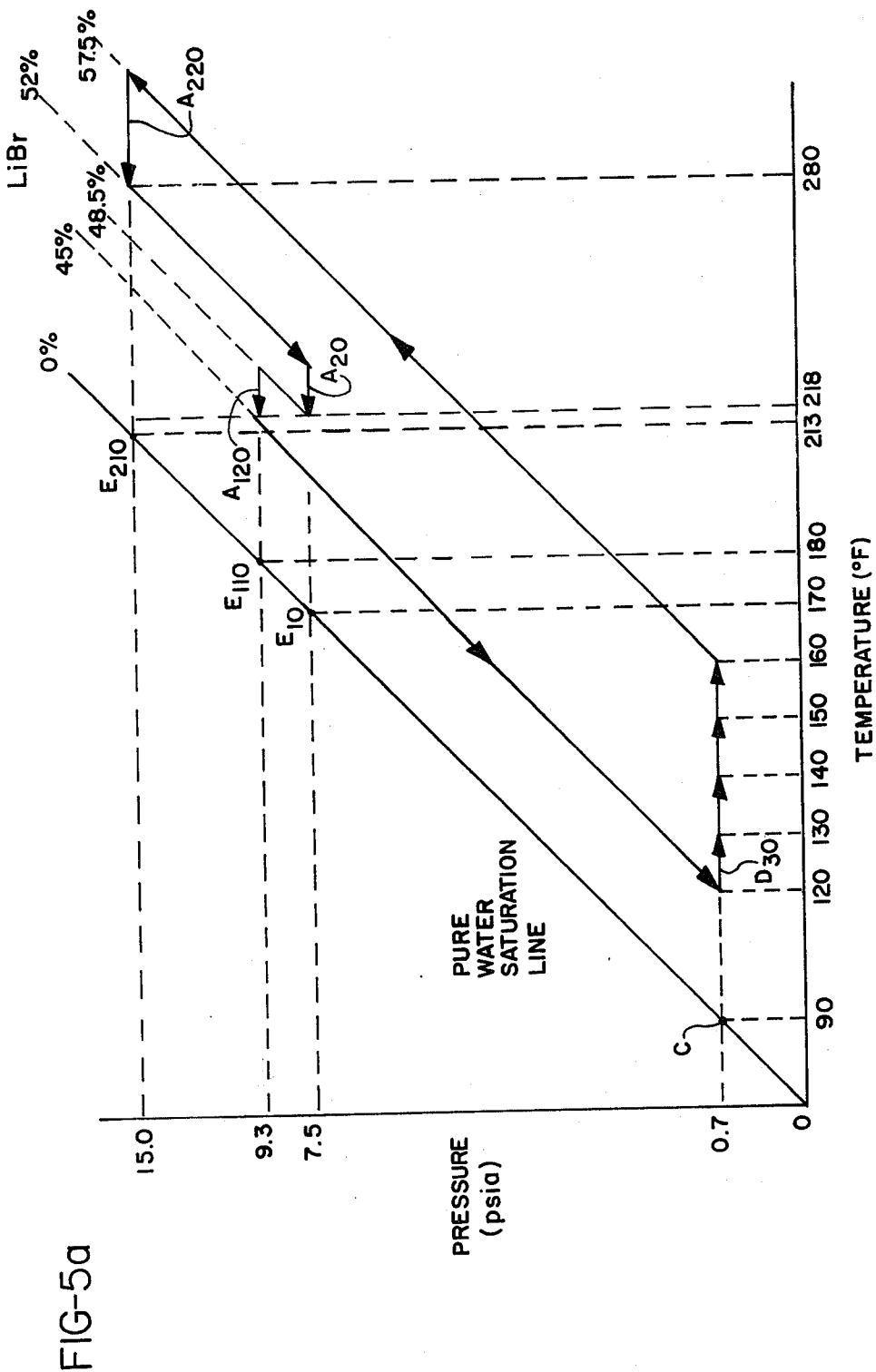

With reference to the pressure-temperature-concentration diagram of FIG. 5a which illustrates the operation of the system of FIG. 4a, a typical condensing temperature of 90° F. is established for the common condenser 40 (designated C). Condensate is pumped through line 46 by pump 44 and distributed to the three evaporators ($E_{10}$, $E_{110}$, and $E_{210}$). As described above, evaporators 10 and 110 are heated by waste heat through heat exchange fluid in conduit 12. Further heat is extracted from the fluid in conduit 12 in successive stages in segmented desorber 30.

Vapor from evaporators 10 and 110 passes through lines 14 and 114, respectively, to absorbers 20 and 120 where it is contacted with absorbent-refrigerant solution. The rich solution leaves absorber 20 at 48.5% LiBr and is pumped via line 123 and pump 129 to absorber 120 where it is enriched in refrigerant to about 45% LiBr at an equilibrium temperature of 218° F.

The solution leaving absorber 120 passes via line 127 through recuperative heat exchanger 126 and expansion valve 128 into segmented desorber 30. The 45% LiBr solution in the desorber is progressively enriched in lithium bromide as it passes through segments 30', 30", 30''' and 30'''' desorbing water as vapor until it leaves the desorber at about a 57.5% LiBr concentration. Waste heat in conduit 12 drives the segmented desorber and has exit temperatures of 160° F., 150° F., 140° F., and 130° F. at each respective segment. The refrigerant lean solution is pumped through line 138 and recuperative heat exchangers 126 and 226 by pump 136 into absorber 220. Water vapor produced in the desorber is collected and transferred through line 32 to condenser 40.

The intermediate level boosted heat produced by the condensation of vapor in absorbers 20 and 120 is transferred to evaporator 210 through closed loop heat exchange conduits 112 and 212. This boosted heat permits evaporator 210 to operate at about 213° F. The vapor produced in evaporator 210 is transferred to absorber 220, and boosted heat is released when that vapor condenses at about 280° F. ($Q_{b2}$). This boosted heat is then available for use where required outside the system.

The absorbent-refrigerant solution leaves absorber 220 via line 225 and passes through recuperative heat exchanger 226 and expansion valve 228 before entering absorber 20. There the solution is enriched to a concentration of 48.5% LiBr.

Figure 4B:
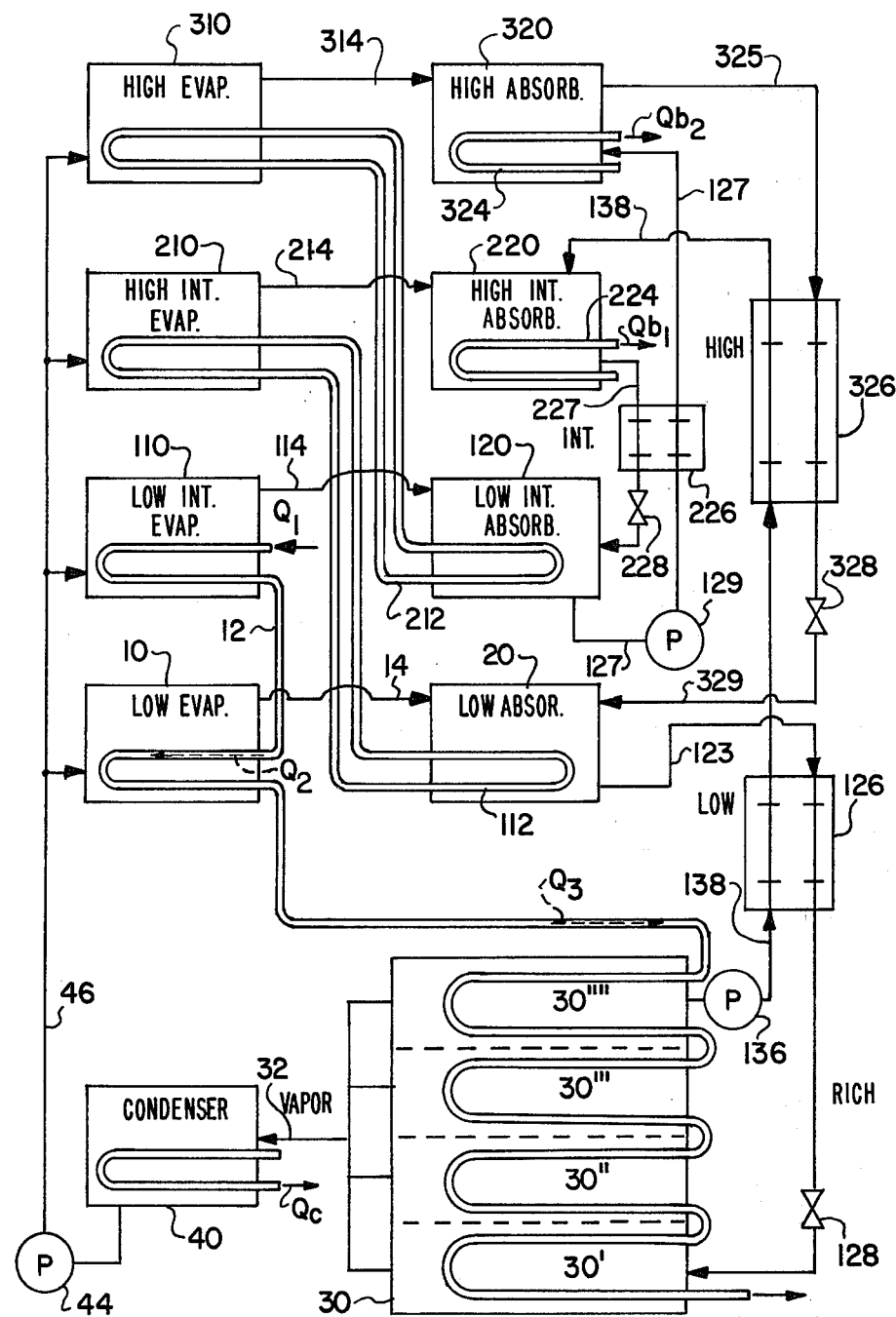

Another example of such a system is illustrated in FIG. 4b where like reference numerals represent like components. Four evaporators 10, 110, 210, and 310 operating at four different pressure and temperature levels are in vapor communication through lines 14, 114, 214, and 314 with absorbers 20, 120, 220, and 320, respectively. Evaporators 10 and 110 obtain heat from a waste heat stream via the heat exchange fluid in conduit 12 while evaporators 210 and 310 obtain heat from absorbers 20 and 120, respectively, through heat exchange fluid in conduits 112 and 212. Absorbers 220 and 320 provide boosted heat $Q_{b1}$ and $Q_{b2}$ at approximately twice the temperature of the difference between the mean recovery temperature of the waste heat source and the ambient sink temperature.

With reference to the pressure-temperature-concentration diagram in FIG. 5b which illustrates the operation of the system of FIG. 4b, a typical condensing temperature of 90° F. is established for the common condenser 40 (designated C). Condensate is pumped through line 46 by pump 44 and distributed to the four evaporators ($E_{10}$, $E_{110}$, $E_{210}$, $E_{310}$). As described above, evaporators 10 and 110 are heated by waste heat through heat exchange fluid in conduit 12. Further heat is extracted from the fluid in conduit 12 in successive stages in segmented desorber 30.

Vapor from evaporators 10 and 110 passes through lines 14 and 114, respectively, to absorbers 20 and 120 where it is contacted with absorbent-refrigerant solution. The rich solution leaves absorber 20 at 45% LiBr and passes via line 123, through recuperative heat exchanger 126, and through expansion valve 128 into segmented desorber 30. The 45% LiBr solution in the desorber is progressively enriched in lithium bromide as it passes through segments 30', 30", 30''', 30'''' until it leaves the desorber with a 58% LiBr concentration. This lean solution is pumped through line 138 and recuperative heat exchangers 126 and 326 by pump 136 into absorber 220. Water vapor produced in the desorber is collected and transferred through line 32 to condenser 40.

Rich solution from absorber 120 at 52% LiBr is transferred via line 127 and pump 129 through recuperative heat exchanger 226 to high pressure absorber 320. There the solution is enriched in water to a concentration of 48.5% LiBr and is transferred via line 325 through recuperative heat exchanger 326 and expansion valve 328 to absorber 20.

The intermediate level boosted heat produced by the condensation of vapor in absorbers 20 and 120 is transferred to evaporators 210 and 310, respectively, through the closed loop heat exchange conduits 112 and 212. This boosted heat permits evaporator 210 to operate at about 203° F. and evaporator 310 at about 236° F. The vapor produced by these evaporators is transferred to absorbers 220 and 320, and boosted heat is released when that vapor condenses into solution at about 278° F. ($Q_{b1}$) and 290° F. ($Q_{b2}$), respectively. This boosted heat is then available for use where required outside the system.

The optimum percentage of lithium bromide and water in the working solutions of the several embodiments of the present invention will, of course, vary depending upon the temperature of the waste heat source, the boost temperature and the relative pressures maintained in the absorbers and desorber. For waste heat sources available at from about 150° F. to 250° F., the working solution composition will vary from about 60–40% lithium bromide to 40–60% water, respectively. The percent solution concentration change from the absorber (rich in water) to desorber (lean in water)

will be about 3-6% for single stage systems to 6-12% for multiple stage systems.

While the method and forms of apparatus herein described constitute preferred embodiments of the invention, it is to be understood that the invention is not limited to these precise methods and forms of apparatus, and that changes may be made therein without departing from the scope of the invention. For example, in many instances substantial equipment simplification is possible by using the countercurrent flow absorber and desorber devices used in the open cycle thermal boost systems disclosed in commonly assigned copending U.S. applications Ser. No. 177,660 entitled OPEN CYCLE THERMAL BOOSTING SYSTEM and Ser. No. 177,695 entitled COUNTERCURRENT FLOW ABSORBER AND DESORBER. In those thermal boost systems, steam is supplied directly to system components rather than indirectly through heat exchange equipment.

What is claimed is:

1. A process for boosting the temperature of a sensible waste heat source available at a first temperature to a higher second temperature comprising the steps of:
   (a) supplying heat from said waste heat source and utilizing a portion of it to evaporate a refrigerant at a relatively high pressure to form a refrigerant vapor,
   (b) contacting said refrigerant vapor with a liquid solution of an absorbent and said refrigerant which is relatively lean in refrigerant to absorb at least a portion of said refrigerant vapor into solution, thereby releasing heat to an external process stream at said higher second temperature,
   (c) passing the resultant relatively refrigerant rich solution to an area of relatively lower pressure and supplying a succeeding portion of heat from said waste heat source to desorb at least a portion of the refrigerant from said refrigerant rich solution as vapor thereby forming a refrigerant lean solution,
   (d) recycling said refrigerant lean solution to again contact it with refrigerant vapor from said evaporating step,
   (e) condensing at least a portion of the desorbed refrigerant vapor to form a refrigerant liquid, and
   (f) returning the condensed refrigerant liquid to said evaporating step.

2. The process of claim 1 in which said first temperature is from 140° to 400° F.

3. The process of claim 1 including passing the relatively refrigerant rich and refrigeration lean solutions through a countercurrent heat exchanger.

4. The process of claim 1 including utilizing successive portions of heat from said waste heat source at successively lower pressures and temperatures to evaporate a plurality of discrete portions of refrigerant, contacting said discrete portions of refrigerant vapor in sequence with respective discrete portions of a liquid solution of an absorbent and said refrigerant which is relatively lean in refrigerant to absorb respective portions of refrigerant vapor, passing the resultant refrigerant rich solution to an area of relatively lower pressure, and supplying succeeding portions of heat from said waste heat source to desorb at least a portion of the refrigerant in said refrigerant rich solution as vapor.

5. The process of claim 4 in which the waste heat is supplied, in alternating sequence, from evaporating means to desorbing means, each operating at sequentially lower temperatures.

6. The process of claim 1 in which said refrigerant is water and said absorbent is lithium bromide.

7. A process for boosting the temperature of a sensible waste heat source available at a first temperature to a higher second temperature comprising the steps of:
   (a) supplying heat from said waste heat source and utilizing a portion of it to evaporate a first portion of refrigerant at a relatively high pressure to form a first portion of refrigerant vapor,
   (b) contacting said first portion of refrigerant vapor with a liquid solution of an absorbent and said refrigerant which is relatively lean in refrigerant to absorb at least a portion of said refrigerant vapor into solution, thereby releasing heat at an intermediate temperature higher than said first temperature,
   (c) supplying at least a portion of said heat at said intermediate temperature and utilizing it to evaporate a second portion of said refrigerant at a pressure higher than the pressure used to evaporate said first portion of refrigerant to form a second portion of refrigerant vapor,
   (d) contacting said second portion of refrigerant vapor with a liquid solution of an absorbent and said refrigerant which is relatively lean in refrigerant to absorb at least a portion of said second portion of refrigerant vapor into solution, thereby releasing heat to an external process stream at said second higher temperature,
   (e) supplying the resultant solution as the entering solution to contact said first portion of refrigerant vapor, and passing the resultant solution which is relatively rich in refrigerant to an area of relatively lower pressure,
   (f) supplying a succeeding portion of heat from said waste heat source to desorb at least a portion of the refrigerant from said relatively refrigerant rich solution as vapor thereby forming a relatively refrigerant lean solution,
   (g) recycling said refrigerant lean solution to contact again said second portion of refrigerant vapor,
   (h) condensing at least a portion of the desorbed refrigerant vapor, and
   (i) returning the condensed refrigerant liquid to said evaporating steps.

8. The process of claim 7 including utilizing successive portions of heat from said waste heat source to desorb a plurality of discrete portions of refrigerant as vapor from solutions of absorbent and refrigerant vapor, the direction of flow of heat from said waste heat source being in counter current relationship to the direction of flow of said solutions.

9. The process of claim 8 including utilizing successive portions of heat from said waste heat source to evaporate a plurality of discrete portions of refrigerant, contacting said discrete portions of refrigerant vapor with respective discrete portions of a liquid solution of an absorbent and said refrigerant to absorb respective portions of refrigerant vapor into solution, thereby releasing heat at intermediate temperatures higher than said first temperature from each respective solution, supplying at least portions of said heat at said intermediate temperatures to evaporate further discrete portions of refrigerant, and contacting the further discrete portions of refrigerant vapor with further discrete portions of liquid solution of absorbent and refrigerant to absorb respective portions of refrigerant vapor into solution, thereby releasing heat at said higher second temperature.

10. A system for boosting the temperature of a sensible waste heat source available at a first temperature to a second higher temperature comprising,
   means for evaporating refrigerant at a relatively high pressure including means for supplying heat to said evaporating means from said source of waste heat, means for contacting the refrigerant vapor produced in the evaporating means with a liquid solution of an absorbent and said refrigerant to absorb at least a portion of said vapor whereby heat is given off at said second higher temperature, means for desorbing at least a portion of the refrigerant in said absorbent refrigerant solution as vapor at a relatively low pressure including means for supplying heat to said desorbing means from said source of waste heat, said means being in fluid communication with the downstream side of said means for supplying heat to said evaporating means, means for condensing at least a portion of the refrigerant vaporized by said desorbing means, and conduit means connecting said evaporating means with said contacting means, said contacting means with said desorbing means, said desorbing means with said condensing means, and said condensing means with said evaporating means.

11. The system of claim 10 including means for recycling said liquid solution from said desorbing means to said contacting means.

12. The system of claim 10 including means for exchanging heat between said recycle means and said conduit means connecting said contacting means with said desorbing means.

13. The system of claim 10 in which said evaporating means comprises a plurality of evaporators each in fluid communication with a common condenser and with a respective contacting means and in which said desorbing means comprises a segmented desorber.

14. The system of claim 12 in which said means for supplying heat to said evaporating means comprises conduit means in heat exchange relationship sequentially with said plurality of evaporators and said means for supplying heat to said desorbing means comprises conduit means in heat exchange relationship sequentially with said segmented desorber.

15. A system for boosting the temperature of a sensible waste heat source available at a first temperature to a second higher temperature comprising, first means for evaporating refrigerant at a relatively high pressure including means for supplying heat to said first evaporating means from said source of waste heat, second means for evaporating refrigerant at a pressure higher than the pressure maintained in said first evaporating means, first means for contacting the refrigerant vapor produced in the first evaporation means with a first liquid solution of an absorbent and said refrigerant to absorb at least a portion of said vapor whereby heat is given off at an intermediate temperature level above said first temperature, means supplying said heat at said intermediate temperature level to said second evaporating means, second means for contacting the refrigerant vapor produced in said second evaporating means with a second liquid solution of an absorbent and said refrigerant to absorb at least a portion of said vapor whereby heat is given off at said second temperature, means for desorbing at least a portion of the refrigerant in said first and second absorbent-refrigerant solutions as vapor at a relatively low pressure including means for supplying heat to said desorbing means from said source of waste heat, said means for supplying heat being in fluid communication with the downstream side of said means for supplying heat to said first evaporating means, means for condensing at least a portion of the refrigerant desorbed as vapor by said desorbing means, and conduit means connecting said first evaporating means with said first contacting means, said second evaporating means with said second contacting means, said first and second contacting means with said desorbing means, said desorbing means with said condensing means, and said condensing means with said first and second evaporating means.

* * * * *